United States Patent
Blaha

[19]
[11] Patent Number: 5,946,973
[45] Date of Patent: Sep. 7, 1999

[54] ADJUSTMENT MECHANISM

[76] Inventor: Friedrich Blaha, Kleinengersdorfer Strasse 100, 2100 Korneuburg/Bisamberg, Austria

[21] Appl. No.: 08/911,116

[22] Filed: Aug. 14, 1997

[30] Foreign Application Priority Data

Aug. 16, 1996 [AT] Austria ..................................... 1476/96

[51] Int. Cl.$^6$ ................................. F16H 1/04; B60N 2/02
[52] U.S. Cl. ................................ 74/422; 74/89; 74/89.17
[58] Field of Search ............................. 74/422, 498, 496, 74/89.17, 89; 297/367, 362

[56] References Cited

U.S. PATENT DOCUMENTS

| | | | |
|---|---|---|---|
| 2,509,161 | 5/1950 | Meyers ....................................... | 74/422 |
| 3,747,976 | 7/1973 | Lacey ........................................ | 297/366 |
| 4,441,758 | 4/1984 | Fleischer et al. ................... | 297/423.46 |
| 5,167,223 | 12/1992 | Koros et al. ............................... | 74/422 |
| 5,247,847 | 9/1993 | Gu ............................................. | 74/422 |

FOREIGN PATENT DOCUMENTS

| | | |
|---|---|---|
| 116 965 A2 | 8/1984 | European Pat. Off. . |
| 21 02 108 | 8/1971 | Germany . |
| 20 09 797 | 2/1972 | Germany . |
| 30 29 558 A1 | 4/1982 | Germany . |
| 32 44 137 A1 | 10/1983 | Germany . |
| 455 202 | 6/1968 | Switzerland . |
| WO 96/11819 | 4/1996 | WIPO . |

*Primary Examiner*—Tamara L. Graysay
*Assistant Examiner*—William C Joyce
*Attorney, Agent, or Firm*—Henry M. Feiereisen

[57] ABSTRACT

An adjustment mechanism includes two structural elements movable relative to one another, with a first structural element being formed with at least one row of substantially cycloidal teeth and with a second structural element including a drive element guided transversely to a direction of adjustment and formed with at least two driving pins capable of rolling over the teeth. The second structural element has at least one attack surface bearing upon an outer envelope of the drive element and is defined by a line of action extending through a line which is oriented essentially between axes of two driving pins engaging in tooth spaces between teeth and bearing upon a bottom land. In this manner, the drive element is pressed in each respective locked position with its driving pins into the bottom land by gravitational forces.

7 Claims, 6 Drawing Sheets

ADJUSTMENT MECHANISM

BACKGROUND OF THE INVENTION

The present invention generally refers to an adjustment mechanism, and more particularly is directed to an adjustment mechanism of a type having two structural elements moveable relative to one another, with the first structural element being formed with at least one row of substantially cycloidal teeth, and with a second structural element including a drive element guided transversely to a direction of adjustment and formed with at least two driving pins capable of rolling over the teeth. Moreover, the present invention refers to an operating device for activating the adjustment mechanism, and in particular to an operating device in the form of a handle, such as a crank.

Such adjustment mechanisms are typically used for moving and adjusting structural elements of different kinds that do not require a continuous control but are adjusted step-by-step for dispositions in especially evenly distributed, predetermined increments, i.e. operate as a stepping drive. These types of adjustment mechanisms are typically used to allow the user to suit the structural elements such as desks, chairs, armrests and backrests, platforms and the like, or other typically hand-operated gearings such as window lifters, sun shades, winches or rope winches, clamping devices etc., to his or her height and to lock the selected position.

Evidently, it is advantageous when the user is afforded the possibility to recognize or sense the locked positions during manual adjustment in order to enable a counting of required incremental steps and to eliminate, by resorting to mechanical locks, the risk that the adjustment mechanism shifts by itself when being fixed in these locked positions. Further, adjustment mechanisms are demanded that are so designed as to overcome a counterforce such as gravitational forces, weight, rope pull force or spring force, and to allow an adjustment in both directions, without necessitating a trigger of a back-run safety devices such as ratchets, or a release of brakes. Moreover, adjustment mechanism of the type involved here should be of simple construction, allow cost-efficient production, is easy to operate, permits manual or motor-driven operation, preferably with (detachable) crank, whereby the rotational direction determines the direction of adjustment, and attains a safe operation, without posing a risk for the operator. Finally, the adjustment mechanism should be of overall small size but yet display a high load-carrying capability. In particular, adjustment mechanisms of this type should be free from play for most applications, e.g. for desks.

Adjustment mechanisms of this type have been known for a long time. It is known e.g. to provide an adjustment mechanism in the form of a pin gearing, with a pinion engaging a rack having two driving pins. The distance between two locked positions equals the distance between the driving pins and corresponds to a rotation of the pinion by 180°. In each locked position, the pinion is secured in place because a displacement of the rack will not cause a rotation of the pinion. These types of adjustment mechanisms have however the drawback that the driving pins can not be subject to high loads because a high rolling pressure is encountered between the relatively small driving pins and the tooth flank, and the lever arm between the contact point of the driving pin and the bottom land of the tooth is relatively long.

Frequently, the use of a overhung-mounted pinion is proposed which is pressed against the rack by a spring force in order to secure the pinion relative to the rack and to ensure that at least one driving pin bears upon the bottom land to substantially increase the load-carrying capability. These types of adjustment mechanisms have, however, the drawback that an overload may cause frictional forces to overcome the spring force so that the driving pins may become at least partially disengaged from the teeth or both driving pins may only bear upon the tooth peaks, resulting in possible damage of the teeth. A substitution of the spring to effect a secure constraint of the pinion can be effected only by resorting to highly complex measures which run counter to the desired simplicity of the adjustment mechanisms. Thus, conventional adjustment mechanisms can be used only at small forces in risk-free areas.

It is also known to use a so called Geneva mechanism in which a pinion is provided with only a single driving pin. This mechanism can not be subjected to high loads and exhibits a particularly long dead travel equaling to about a ¾ revolution of the pinion, without effecting any adjusting action.

SUMMARY OF THE INVENTION

It is thus an object of the present invention to provide an improved adjustment mechanism, obviating the afore-stated drawbacks.

In particular, it is an object of the present invention to provide an improved adjustment mechanism which can be easily and safely be operated while yet displaying a small overall size, and can be subject to high loads as well as enables universal application, cost-efficient manufacture and can be designed with an optically pleasing look.

These objects, and others which will become apparent hereinafter, are attained in accordance with the present invention by providing the second structural element with at least one attack surface which bears upon an outer envelope of the drive element and is defined by a line of action (surface normal) extending through a line which is oriented essentially between the axes of two driving pins that engage in tooth spaces between teeth and bear upon in the bottom land.

By configuring the second structural element in this manner, the drive element is urged under the influence of the gravitational forces or another force continuously by the attack surface towards the teeth, and thus each driving pin is pressed into the bottom land so that the drive element is securely fixed in place in the respectively locked position. In most applications, the adjustment mechanism is mounted in substantially vertical disposition. As in this case, gravitational forces are exploited for locking the drive element, the adjustment mechanism should be so mounted as to dispose the attack surface above the drive element. At substantially horizontal disposition of the adjustment mechanism, the attack surface must be pressed against the drive element by means of a power source, e.g. a mechanical or pneumatic spring.

Advantageously, the attack surface may form a section of a guide extending perpendicular to the direction of adjustment to effect a particularly simple configuration. Moreover, the guide may exhibit a second attack surface in opposition of the first attack surface and defined by a line of action extending through a line which extends essentially between the axes of two driving pins engaging in tooth spaces between teeth and bearing upon the bottom land so that the adjustment mechanism is effective in both directions.

An extremely compact, space-saving construction is created when configuring the outer envelope of the drive element in the form of an elliptic cylinder.

In the event greater forces impact the adjustment mechanism, it is advantageous to configure the outer envelope of the drive element as circular cylinder, with the drive element preferably including three driving pins.

A particularly low friction adjustment mechanism is effected by forming the drive element as rolling-contact bearing.

According to another feature of the present invention, the drive element is supported with its outer envelope by a rocker articulated to the second structural element and defining a longitudinal axis which extends through a line oriented essentially between the axes of two driving pins engaging in tooth spaces between teeth and bearing upon the bottom land, with the attack surface being formed by the wall of the bearing bore of the rocker.

The drive element may be configured in the form of a prism, with the driving pins being arranged at odd number of prism edges in an area of the prism edges, and at even number of prism edges centrally between the prism edges. In this manner, the drive element is secured in its respective locked position not only in a force-locking manner but also in a form-fitting manner. The drive element may also be configured as equi-thick member, with the driving pins being arranged in corner areas of the drive element. A compact, space-saving adjustment mechanism can also be effected by providing the drive element in the form of a cylinder piston of a rotating piston machine, with the driving pins corresponding to the cylinders.

As most applications desire identical incremental adjusting steps, the driving pins are advantageously arranged at uniform distances from one another.

A simple to manufacture and still robust adjustment mechanism is attained when the driving pins are hollow and preferably designed in the form of clamping sleeves. The use of clamping sleeves allows a manufacture of the drive element of relatively great tolerances.

Advantageously, the first structural element is formed in opposition to the row of teeth with a row of adjoining arcuated recesses having a radius which corresponds to a distance defined between two driving pin axes and increased by the radius of a driving pin. In this manner, the drive element is safely constrained under load.

A reduction of friction and thus a simplified operation of the adjustment mechanism is effected when the attack surface is formed by a section of an inner ring of a rolling-contact bearing. The same purpose is attained when rotatably supporting the driving pins in the drive element.

Advantageously, the driving pins project out from the second structural element to facilitate the attachment of a tool, implement, or a motor drive for operating the adjustment mechanism. In order to create a visually pleasing look and at the same time reduce the risk of injury by the teeth, the drive element includes two protective disks in parallel relationship between which the driving pins are positioned.

Actuation of the adjustment mechanism according to the present invention can be effected by providing the drive element with a central bore of noncircular cross section for engagement of a tool. This central bore may exhibit a hexagonal prismatic configuration for engagement of a prismatic wrench (Allen key). Alternatively, the central bore may also be bound by partial surfaces of a circular cylinder which corresponds to sections of the outer envelope of the driving pins and sections of a circular cylindrical surface terminating approximately at the driving pin axes and serving for engagement of a multigrooved wrench (torx wrench).

According to another feature of the present invention, the drive element may be formed by at least two blind bores or throughbores spaced from one another and accessible from outside for engagement of a pin plug. The same purpose is accomplished by providing the drive element with a protrusion that is accessible from outside, in particular a protrusion of hexagonal, prismatic configuration.

According to yet another feature of the present invention, the drive element may project out from the second structural element to facilitate actuation of the drive element. In order to prevent the drive element from turning by itself when the adjustment mechanism is not subject to any load, the drive element may be retained by a safety element, preferably a leaf spring, in direction of the teeth.

A simplified assembly of the individual components of the adjustment mechanism can be accomplished by providing the first structural element with an opening that is positioned in an end region of the row of teeth and is of greater dimension than the drive element, whereby the last tooth in this end region is spaced from the penultimate tooth at a greater distance so as to deviate from the tooth pitch. Advantageously, the row of teeth extends linearly and at an angle to the direction of adjustment so that the length of the adjusting step is smaller than the tooth pitch.

A progressive adjustment is effectuated by forming the row of teeth nonlinear and/or polygonal at an angle to the adjustment direction.

It should be noted that the adjustment mechanism according to the present invention should not be limited to linear motions. Rather rotational motions or swivel motions should also be considered within the scope of the present invention. Such motions can be accomplished by forming the first structural element in the form of a disk or disk segment, with the row of teeth being arranged at the circumference or arched section. This allows the application of the invention e.g. in conjunction with rope winches, flaps, pivot-hung windows or the like.

For certain applications, such as desks or drawing tables, it may be suitable to unit or link the adjustment mechanism to at least a further such adjustment mechanism, with the drive elements being connected to one another, optionally detachably, in a non rotatable manner.

In order to allow the adjustment mechanism according to the present invention to be mounted in any orientation, the provision of a power source may be required to maintain the attack surface of the second structural element in contact with the drive element.

In the event, the drive element is not permanently connected to an operating device, it is proposed, in accordance with the present invention, to provide an operating device for the adjustment mechanism in the form of a handle such as a crank or with a hexagonal protrusion, or multigrooved protrusion, wrench opening, wrench ring, ring wrench with elliptic or equi-thick angular bore, or with pins so designed as to complement the hollow driving pins or to complement the bores in the drive element. Suitably the drive element may be structurally united with such an operating device or a drive motor.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
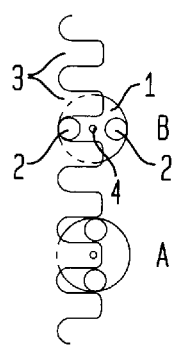
FIG. 1 is a schematic, simplified cutaway illustration of a conventional adjustment mechanism in two positions during actuation.

Throughout all the Figures, the same or corresponding elements are generally indicated by the same reference numerals.

Turning now to the drawing, and in particular to FIG. 1, there is shown a schematic, simplified cutaway illustration of a conventional adjustment mechanism in two positions during actuation, denoted by reference characters A and B. The conventional adjustment mechanism includes a disk-shaped drive element 1 which is formed with two driving pins 2 for cooperation with a row of teeth 3. The drive element 1 is supported by a structural element, not shown in detail here, for rotation about an axis 4. In position A, both driving pins 2 engage between successive teeth 3 to effect a locked position as the drive element 1 blocks the row of teeth 3 against the displacement. As the driving pins 2 travel during adjustment of the adjustment mechanism and rotation of the drive element 1 along a circular path about the axis 4, the teeth 3 must be of relatively long configuration, as shown in position B. It will be appreciated by persons skilled in the art that the adjustment mechanism must contain much mechanical apparatus which does not appear in the drawing for the sake of simplicity.

Figure 2:
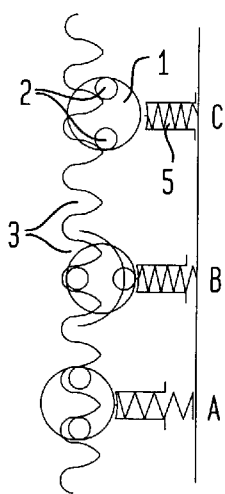
FIG. 2 is a schematic, simplified cutaway illustration of another conventional adjustment mechanism in three positions during actuation.

FIG. 2 shows a schematic, simplified cutaway illustration of another conventional adjustment mechanism in the form of a disk-shaped drive element 1 with two driving pins 2, whereby the drive element 1 is overhung-mounted and biased by a spring 5 in direction towards the teeth 3. In the locked position, denoted by reference character A, the spring 5 presses the driving pins 2 into the respective bottom land. Upon actuation of the adjustment mechanism and ensuing rotation of the drive element 1, one driving pin 2 remains always in the bottom land between two neighboring teeth 3, as shown in position B. When this conventional adjustment mechanism is subject to greater loads or greater frictional forces or displays a fatigued spring 5, the driving pins 2 may slip off the flanks of the cycloidal teeth 3 and even become disengaged from the teeth 3 (position C). The present invention eliminates this drawback.

Figure 3A:
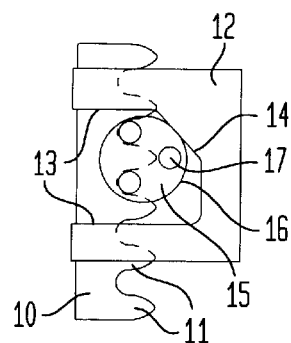
FIGS. 3A–3C are a schematic, simplified cutaway illustration of a first embodiment of an adjustment mechanism according to the present invention, illustrating three different positions.
Figure 3B:
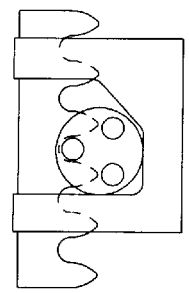
Figure 3C:
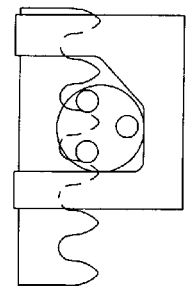

Turning now to FIG. 3, there is shown a schematic, simplified cutaway illustration of a first embodiment of an adjustment mechanism according to the present position, shown in three positions, namely in locked position A, during adjustment denoted by reference character B, and in a retracted position C in which the drive element 15 is positioned furthest away from the tooth space and the teeth 11 are loaded to a greatest extent. A comparison with the conventional adjustment mechanisms shown in FIG. 1 and FIG. 2 demonstrates that in position C, the teeth 11 of the adjusting mechanism according to the present invention are subject to much less load.

The adjustment mechanism, shown in FIG. 3, includes a first structural element 10 which includes a row of cycloidal teeth 11, typically formed by a rack that is slidably guided for longitudinal displacement in a second structural component 12. The first structural part 10 may be secured to a table leg or may form part thereof while the second structural element 12 is then secured to a table top. The second structural element 12 includes a guide member 13 which extends perpendicular to the first structural element 10 and thus to the direction of adjustment and is formed on one side with a slanted attack surface 14. A drive element 15 is overhung-mounted in the guide member 13 and is of circular cylindrical configuration. The drive element 15 is formed on one end face with three driving pins 17 spaced from one another at equal distances.

Figure 4:
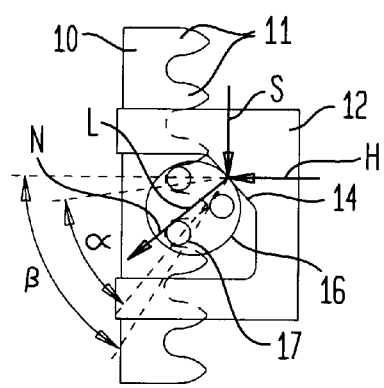
FIG. 4 is a schematic, simplified cutaway illustration of the adjustment mechanism of FIG. 3, with schematic representation of applied forces.

FIG. 4 shows a schematic representation of applied forces to which the adjustment mechanism according to the present invention is subject. The attack surface 14 so extends at an angle to the direction of adjustment that the line of action N (surface normal) runs through a line L which is located between the axes of two driving pins 17 that engage in tooth spaces between teeth and bear upon the bottom land, as indicated by angle α. When taking into an account generated frictional forces, the line of action N may also extend slightly outside the driving pin axes, as indicated by angle β. In locked position, the attack surface 14 bears upon the outer envelope 16 of the drive element 15, with the drive element 15 being acted upon by the gravitational force S and a horizontal force H so that both driving pins 17 engaging in the tooth spaces are securely pressed against the bottom land as a result of the course of the line of action N and the resultant force acting in the same direction. Thus, the adjustment mechanism is securely fixed in place in the respectively locked position. A suitably selected geometry enables the reaction forces applied in the support of the structural elements 10, 12 relative to one another to eliminate a play of the guide member 13.

The movement between two locked positions requires a rotation of the drive element 15 by 120°.

Figure 5:
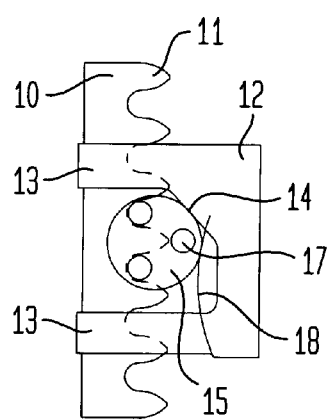
FIG. 5 is a schematic, simplified cutaway illustration of the adjustment mechanism of FIG. 3, provided with a safety device for the drive element.

The forces of the slanted attack surface 14 by which the driving pins 17 of the drive element 15 are urged into the tooth system, as well as the frictional forces upon the contact surfaces are directly proportional to the adjustment force as a result of the force balance. Thus, unlike spring-biased mechanisms, the mechanical behavior of the adjustment mechanism according to the present invention is independent of the load. Still, it may be suitable to provide a weak spring 18, as shown in FIG. 5, to ensure that the freely moveable drive element 15 is kept in place when not being subject to any load, e.g. during transport or assembly, in order to prevent an unintentional displacement. The spring 18 is however only required as far as control of the own weight of the drive element 15 is concerned and does not assume any function in conjunction with the actual adjustment action.

The contact pressure within the adjustment mechanism is relatively low because the driving pins 17 bear upon the rounded section of the bottom land, and the drive element 15 has a much greater diameter than the driving pins 17 so that the pressure on the mostly flat attack surface 14 is also slight.

Figure 6:
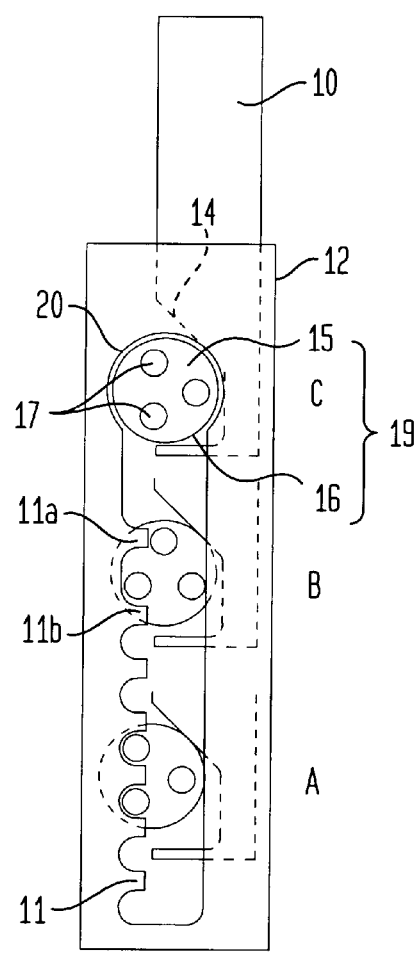
FIG. 6 is a schematic, simplified cutaway illustration of the end region of the row of teeth.

FIG. 6 shows the row of teeth 11 at an end region 19 so designed as to facilitate assembly of the adjustment mechanism and to prevent the drive element 15 from detachment when occupying the end position C. The second structural element 12 is formed with an opening 20 which slightly exceeds the drive element 15 so that the drive element 15 can be inserted through this opening 20 laterally of the second structural element 12 and disposed in the desired position. In order to make sure that the end position C is not reached during normal operation, the last tooth 11a is spaced from the penultimate tooth 11b at a greater distance than the normal tooth width between teeth 11 so that the drive element 15 is blocked against further rotation, as indicated in position B. This position can be overcome only when the adjustment mechanism is completely relieved and generally by applying additional aids. The position A represents the locked position.

Figure 7A:
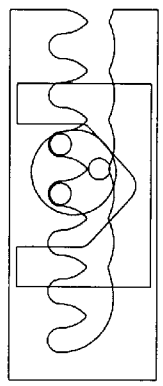
FIGS. 7A–7B are a schematic, simplified cutaway illustration of a second embodiment of an adjustment mechanism according to the present invention for bi-directional adjustment, with the drive element being constrained and shown in two different positions.
Figure 7B:
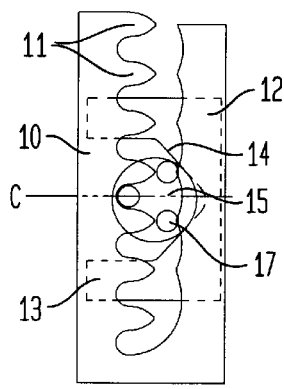

FIG. 7 shows an embodiment of an adjustment mechanism according to the present invention in which the second structural element 12 is movably supported in the first structural element 10 and allows an adjustment in both directions, with the drive element 15 being constrained during guidance. In order to effect an adjustment in both directions, the second structural element 12 is formed with two attack surfaces 14 in opposite disposition and in symmetry to a center axis C of the guide member 13. The forced guidance of the drive element 15 is effected by forming the first structural element 10 in opposition to the row of teeth 11 with a row of adjoining arcuated recesses 12 having a radius which corresponds to the distance defined between two driving pin axes and increased by the radius of a driving pin. Position A represents the locked position while position B is reached by the adjustment mechanism during adjustment. The adjustment mechanism according to FIG. 7 can be subject to highest loads.

Figure 8:
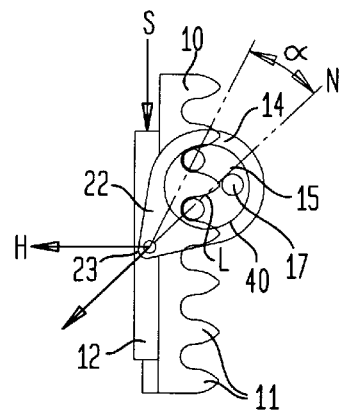
FIG. 8 is a schematic, simplified cutaway illustration of a third embodiment of an adjustment mechanism according to the present invention.

FIG. 8 shows a further embodiment of an adjustment mechanism according to the present invention in which the drive element 15 is supported by a rocker 22 which is articulated to the second structural element for rotation about an axis 23 and is of such length that the drive element 15 is capable of rolling with its driving pins 17 over the teeth 11. The rocker 22 exhibits a bearing bore 40 which receives the drive element 15 and is bound by a wall which forms the attack surface 14. The rocker 22 defines a longitudinal axis N which also in this case extends through a line L which is oriented essentially between the axes of two driving pins 17 engaging in tooth spaces between teeth 11 and bearing upon the bottom land, as indicated by the angle α.

The axis 23 is arranged behind the teeth 11 and underneath the drive element 15. However, it is certainly possible and within the scope of the present invention to dispose the axis 23 also ahead of the teeth 11 as well as above the drive element 15. The shown arrangement is however preferred because a simple reversal of the rocker 22 enables an adjustment in both directions.

Figure 9:
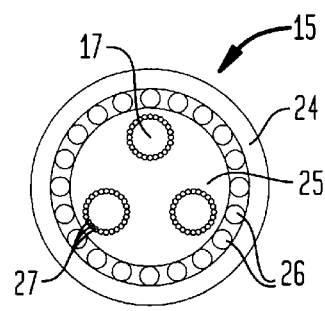
FIG. 9 is a schematic illustration of a variation of a drive element.

FIG. 9 shows a variation of the drive element 15 in the form of a rolling-contact bearing, including an outer ring 24 and an inner cylinder 25, with rolling elements 26 being disposed between the cylinder 25 and the outer ring 24. The drive element 15 is formed with three driving pins 17 spaced from one another at same distances and rotatably supported by rolling elements 27 about the cylinder 25. In this manner, the adjustment mechanism is of extremely low friction configuration.

Figure 10:
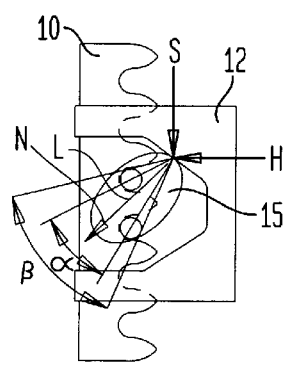
FIG. 10 is a schematic, simplified cutaway illustration of a fourth embodiment of an adjustment mechanism according to the present invention, with a drive element designed of elliptic configuration and schematic representation of applied forces.

Persons skilled in the art will appreciate that the configuration of the drive element 15 should not be limited to a circular cylindrical shape, as will be described in more detail hereinafter with respect to FIGS. 10 and 11. FIG. 10 shows a further embodiment of an adjustment mechanism according to the present invention in which the drive element 15 is shaped in the form of an elliptic cylinder and supports two driving pins 17. As in the embodiment shown in FIG. 3 and FIG. 4, the driving pins 17 are pressed by means of a slanted attack surface 14 against the bottom land, with the line of action N extending through a line L which is oriented essentially between the axes of both driving pins 17 bearing upon the bottom land, as indicated by angle α. As a result of created frictional forces, the line of action N may however also extend slightly outside of the axes of the driving pins 17, as indicated by angle β.

Figure 11:
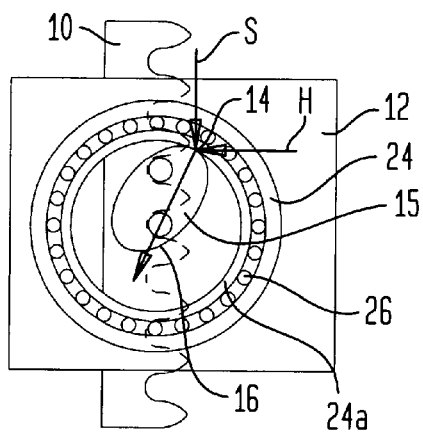
FIG. 11 is a schematic, simplified cutaway illustration of a fifth embodiment of an adjustment mechanism according to the present invention, with a drive element designed of elliptic configuration and of schematic representation applied forces.

FIG. 11 shows a further embodiment of an adjustment mechanism according to the present invention which allows a particular low friction contact of the attack surface 14. The attack surface 14 is formed by a section of an inner ring 24a of a rolling-contact bearing having an outer ring 24 secured to the second structural element 12. This type of adjustment mechanism is effective in both directions.

Figure 12:
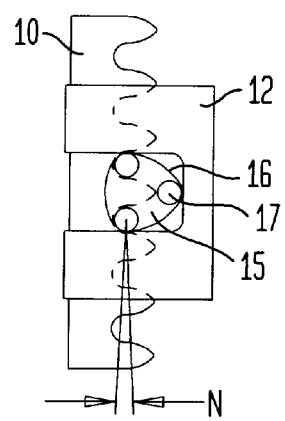
FIG. 12 is a schematic, simplified cutaway illustration of a sixth embodiment of an adjustment mechanism according to the present invention, with a drive element designed of equi-thick configuration.

FIG. 12 shows a variation of the drive element 15 of equi-thick configuration, with the line of action N extending in locked position through the axes of two driving pins 17 bearing upon the bottom land. Depending on the friction, slight positional deviations of the line of action N are permissible. While this variation of the adjustment mechanism is also effective in both directions, it has the additional advantage of having hardly any play.

Figure 13:
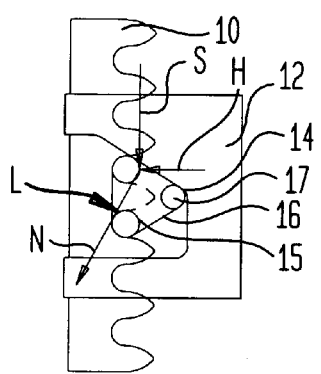
FIG. 13 is a schematic, simplified cutaway illustration of the adjustment mechanism of FIG. 3, with the drive element of prismatic configuration and odd number of driving pins.
Figure 14:
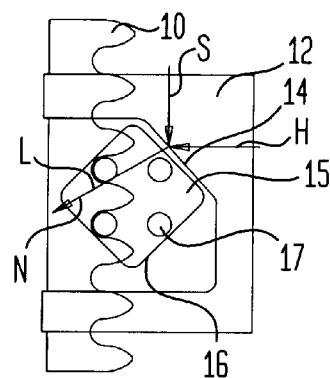
FIG. 14 is a schematic, simplified cutaway illustration of the adjustment mechanism of FIG. 3, with the drive element of prismatic configuration and even number of driving pins.

FIGS. 13 and 14 show the adjustment mechanism according to FIG. 3, with the difference residing in the prismatic configuration of the drive element 15. Suitably, in the event the drive element 15 has an odd number of prism surfaces 16, as shown in FIG. 13, the driving pins 17 are arranged in proximity of the prism edges, while in the event the drive element 15 has an even number of prism surfaces 16, the driving pins 17 are disposed centrally between the prism edges, as shown in FIG. 14. In the latter configuration, the locked position of the drive element 15 results in a parallel disposition of the attack surface 14 relative to the prism surface 16 to thereby effect a flat contact. Thus, the drive element 15 is secured in the locked position in a force-locking as well as form-fitting manner.

Figure 15:
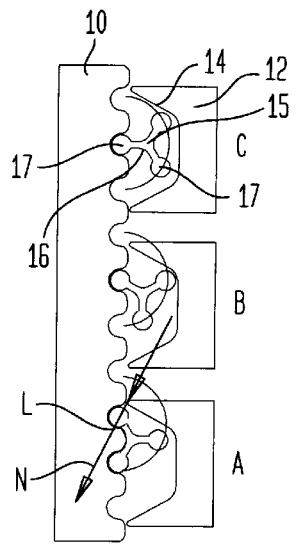
FIG. 15 is a schematic, simplified cutaway illustration of a seventh embodiment of an adjustment mechanism according to the present invention.

FIG. 15 shows a further embodiment of adjustment mechanism according to the present invention, in which the drive element 15 exhibiting the shape of a three-winged cylinder piston of a rotating piston machine, with the driving pins 17 corresponding to the cylinders of the piston. The drive element 15 can be made by shaping an extruded section with the shown cross section from which the drive element 15 is cut to size. This embodiment of the adjustment mechanism is advantageous in particular when being subject to high loads because of the possible interaction with several parallel rows of teeth that can be formed for example from a U-shaped section. Moreover, a single, rod-shaped drive element 15 can be used for several neighboring adjustment mechanisms whereby separate connections or couplings can be omitted.

Figure 16:
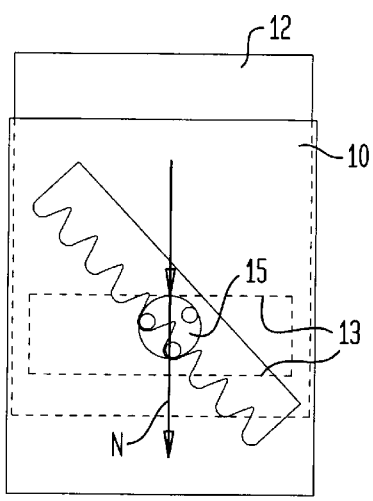
FIG. 16 is a schematic, simplified cutaway illustration of an eighth embodiment of an adjustment mechanism according to the present invention, depicting a slanted row of teeth with respect to a direction of adjustment.
Figure 17:
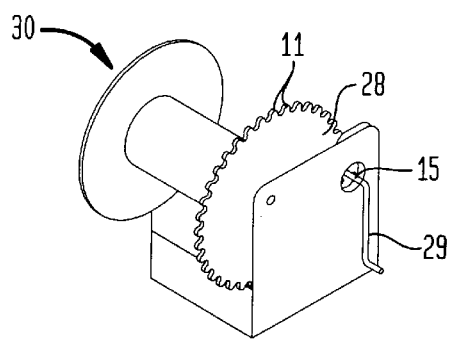
FIG. 17 is a schematic perspective illustration of a ninth embodiment of an adjustment mechanism according to the present invention, depicting a curved row of teeth.
Figure 18:
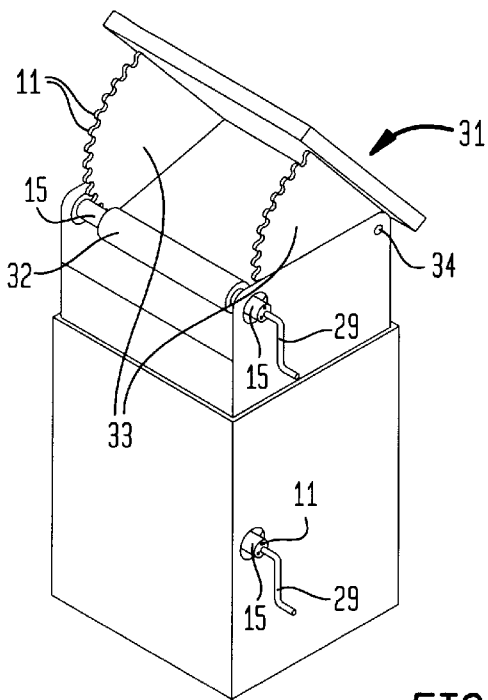
FIG. 18 is a variation of the adjustment mechanism of FIG. 17 with curved row of teeth.

FIG. 16 shows a further embodiment of an adjustment mechanism according to the present invention in which the adjustment step is smaller than the tooth pitch, by arranging the row of teeth 11 linearly and slantingly to the direction of adjustment. The row of teeth 11 may further also be shaped of arcuated or polygonal configuration to effect a progressively adjustable adjustment mechanism. Arcuated teeth are also shown in the embodiments of FIGS. 17 and 18. FIG. 17 shows a variation in which the teeth 11 are arranged about the perimeter of a disk 28. The drive element 15 engaging with its driving pin 17 in the teeth 11 is secured in its respective locked position in the same manner as described above, and connected to a hand crank 29. The disk 28 is part of a rope winch 30 which is actuatable by the crank 29 and does not require any detent pawl for effecting a locking action. In this case, the counterforce is provided by the rope pull force.

A similar construction is shown in FIG. 18 which shows a vertically adjustable and tiltable lectern. The adjustment mechanism for vertical adjustment is shown at the lower part of the FIG. 18 and includes a drive element 15 actuated by a crank 29. A tilting of the lectern 31 is effected by two drive elements 15 mounted at a distance to one another on a common shaft 32 and engaging with its driving pin 17 in teeth 11 which are arranged about an arched section of two circular sector shaped side walls 33. The side walls 33 are pivotable about a common axis 34 and carry the lectern top which can be adjusted by the adjustment mechanism at various angles relative to the horizontal. The drive elements 15 of the adjustment mechanism for tilting the lectern top is also actuated by a crank 29.

Instead of the common shaft 32, it is also possible to provide a cardan drive or a non-rotatable, flexible shaft, which e.g. is advantageous for application in tables in view of the required leg freedom.

Figure 19:
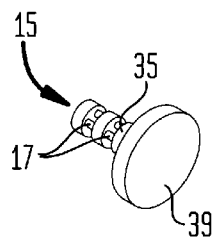
FIGS. 19, 19a, 19b, 19c show various operating devices for actuating an adjustment mechanism according to the present invention, with illustration of a further variation of a drive element.
Figure 19A:
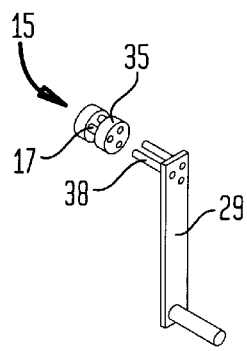
Figure 19B:
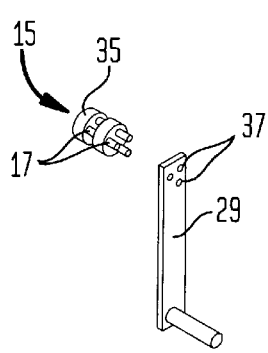
Figure 19C:
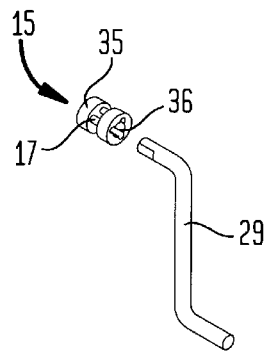

FIGS. 19, 19a, 19b, 19c show various operating devices for actuating the adjustment mechanism according to the present invention, with illustration of a slightly modified drive element 15. The base configuration of the drive element 15 of this type is made of two or three parallel disks 35 between which the driving pins 17 are situated. The driving pins 17 may be designed of hollow configuration as shown in FIG. 19a and provided advantageously in the form of clamping sleeves which extend through the disks 35. Alternatively, the driving pins 17 may also project out from the drive element 15, as shown in FIG. 19b, or the drive element 15 may be formed on one end face with a central bore 36 of a radius that approximately reaches the axes of the driving pins 17, as shown in FIG. 19c. All these configurations of the drive element 15 allow the insertion of an activating key in form of a crank 29. In accordance with FIG. 19c, the crank 29 is formed as multigrooved socket wrench. In the embodiment of the drive element 15 as shown in FIG. 19b, the crank 29 is formed on one end with holes 37 of a number equal to the number of driving pins 17. In the event the driving pins 17 are of hollow configuration as shown in FIG. 19a, the crank 29 is formed on one end with pins 38 of a number preferably corresponding to the number of driving pins 17. The use of clamping sleeves as driving pins 17 has the advantage of a simplified manufacture of the drive element 15 and allows formation of the bores in the drive element 15 for engagement by the clamping sleeves without necessitating narrow tolerances.

As shown in FIG. 19, the crank 29 may also be substituted by a hand wheel 39 or even by a motor drive for operating the drive element 15 which is held by means of torque support.

It will be understood by persons skilled in the art that the operation of the drive element 15 may also be effected by other devices such as wrenches, fork wrenches or ring wrenches or the like, whereby the drive element 15 may also include depending on the course of its axis differently shaped recesses or protrusions, in particular prismatic recesses or protrusions for attachment of a wrench.

A symmetric configuration of the adjustment mechanism, e.g. two external rows of teeth and an attack surface in the middle or vice versa results in an even load action upon the structural elements and thus in an increase of the load-carrying capability.

The outer geometry of the drive element 15 and the geometry of the guide member 13 determine as a result of their interaction the mechanical behavior. Suitably, the outer geometry is selectable within geometrically suitable limits, especially, the inclination of the attack surface 14 is determinative for the direction of the reaction force and thus the size of the locking force, the contact force of the drive element 15 into the row of the teeth 11, the force pattern during adjustment as well as the freedom of play of the adjustment mechanism by the reaction forces in the support of the individual components relative to one another. In particular, a curved configuration of the flanks of the guide member allows a modification of the direction of the pressure force within geometrically possible limits. The respective force distribution and force patterns as well as adjustment force and adjustment path in dependence from the rotation of the drive element and crank force can be determined in accordance with elementary rules of mechanics.

A further possibility of variation is effected by an irregular arrangement of the driving pins and a row of complementary, irregularly arranged teeth in the event varying positional distances and locked positions are demanded.

In addition, a modification may also be attained without departing from the spirit of the invention by a design of the adjusting mechanism with two, four or even more driving pins. Even though an embodiment with three driving pins is preferred, a different number of driving pins may be suitable for effecting one or another function. The adjustment mechanism according to the invention can be used in horizontal disposition whereby the gravitational force is substituted by a power source, e.g. a spring or a pneumatic cylinder.

While the invention has been illustrated and described as embodied in an adjustment mechanism, it is not intended to be limited to the details shown since various modifications and structural changes may be made without departing in any way from the spirit of the present invention.

What is claimed as new and desired to be protected by Letters Patent is set forth in the appended claims:

1. An adjustment mechanism, comprising:

a first structural element formed with at least one row of teeth;

a second structural element, said first and second structural elements being movable relative to one another in an operating direction; and a drive element guided by the second structural element and formed with at least two driving pins capable of rolling over the teeth, said drive element being floatingly supported and having an outer surface area which bears upon a first attack surface of the second structural element to define a contact area, wherein a normal drawn perpendicular to the attack surface in the contact area extends between two driving pins which are engaged upon bottom lands of successive teeth when the driving pins occupy a locking position, wherein the first structural element has an opening positioned in an end region of the row of teeth and being of greater dimension than the drive element, wherein a last tooth in this end region is spaced from a penultimate tooth at a distance which is greater than the tooth pitch.

2. The adjustment mechanism of claim 1 wherein the second structural element includes a guide member extending perpendicular to the operating direction and having a section forming the attack surface.

3. An adjustment mechanism, comprising:

a first structural element formed with at least one row of teeth;

a second structural element formed with a slanted planar attack surface which extends at an angle to the first structural element, said first and second structural elements being movable relative to one another in an operating direction; and a drive element formed with a plurality of driving pins capable of rolling over the teeth, said drive element being floatingly supported by the second structural element and movable between an extended locking position and a retracted position, said drive element having an outer surface area which bears upon the slanted attack surface of the second structural element during travel between the locking position and the retracted position such that a normal drawn perpendicular to the attack surface at a point of contact between the outer surface area of the drive element and the attack surface extends between two of the driving pins engaged in successive teeth of the first structural element.

4. The adjustment mechanism of claim 3 wherein the two driving pins bear on bottom lands of the teeth in the locking position.

5. The adjustment mechanism of claim 3 wherein the drive element and the driving pins formed on the drive element are positioned at furthest distance from bottom lands of the teeth in the retracted position.

6. The adjustment mechanism of claim 3 wherein the second structural element includes a guide member extending perpendicular to the operating direction and having a section forming the attack surface.

7. The adjustment mechanism of claim 3 wherein the first structural element has an opening positioned in an end region of the row of teeth and being of greater dimension than the drive element, wherein a last tooth in this end region is spaced from a penultimate tooth at a distance which is greater than the tooth pitch.

* * * * *